United States Patent
Adachi et al.

(10) Patent No.: US 9,230,713 B2
(45) Date of Patent: Jan. 5, 2016

(54) CONDUCTIVE PATH STRUCTURE AND WIRE HARNESS

(75) Inventors: Hideomi Adachi, Kosai (JP); Hidehiko Kuboshima, Kosai (JP); Yoshiaki Ozaki, Kosai (JP)

(73) Assignee: YAZAKI CORPORATION, Tokyo (JP)

(*) Notice: Subject to any disclaimer, the term of this patent is extended or adjusted under 35 U.S.C. 154(b) by 115 days.

(21) Appl. No.: 13/819,506

(22) PCT Filed: Sep. 16, 2011

(86) PCT No.: PCT/JP2011/071781
§ 371 (c)(1),
(2), (4) Date: Feb. 27, 2013

(87) PCT Pub. No.: WO2012/036319
PCT Pub. Date: Mar. 22, 2012

(65) Prior Publication Data
US 2013/0153292 A1    Jun. 20, 2013

(30) Foreign Application Priority Data

Sep. 16, 2010  (JP) .................................. 2010-207552
Sep. 1, 2011   (JP) .................................. 2011-190359

(51) Int. Cl.
*H01B 7/00*      (2006.01)
*H01B 3/30*      (2006.01)
(Continued)

(52) U.S. Cl.
CPC ................ *H01B 7/009* (2013.01); *B60K 28/14* (2013.01); *B60K 2028/006* (2013.01); *H01B 7/328* (2013.01)

(58) Field of Classification Search
CPC ........... B60R 16/0215; B60R 16/0207; B60K 2028/006; B60K 28/14; H01B 7/328

USPC ........................ 174/72 A, 110 R; 200/61.08; 337/157–160, 168
See application file for complete search history.

(56) References Cited

U.S. PATENT DOCUMENTS 3,818,407 A * 6/1974 Edgerton ...................... 337/199
3,830,331 A   8/1974 Piazza
(Continued)

FOREIGN PATENT DOCUMENTS

CN    1650373 A    8/2005
CN    101740166 A  6/2010
(Continued)

OTHER PUBLICATIONS

International Search Report dated Dec. 9, 2011 from the International Searching Authority in counterpart application No. PCT/JP2011/071781.
(Continued)

*Primary Examiner* — Sherman Ng
(74) *Attorney, Agent, or Firm* — Sughrue Mion, PLLC

(57) ABSTRACT

A conductive path structure includes a conductor that includes a first conductive portion and a second conductive portion which are connected to each other through a cut-off facilitating portion, and an insulation member that covers the cut-off facilitating portion directly or indirectly. When the cut-off facilitating portion is cut off so as to separate the first conductive portion and the second conductive portion to each other due to an impact applied to the cut-off facilitating portion, the insulation member is configured so as to cover the separated first conductive portion and the separated second conductive portion.

12 Claims, 11 Drawing Sheets

(51) Int. Cl.
- *H01H 73/24* (2006.01)
- *H01H 85/04* (2006.01)
- *H01H 71/10* (2006.01)
- *B60K 28/14* (2006.01)
- *B60K 28/00* (2006.01)
- *H01B 7/32* (2006.01)

(56) References Cited

U.S. PATENT DOCUMENTS

| | | | |
|---|---|---|---|
| 3,848,100 A * | 11/1974 | Kozorezov et al. | 200/61.08 |
| 4,118,684 A * | 10/1978 | Mollenhoff | 337/296 |
| 4,150,354 A * | 4/1979 | Namitokov et al. | 337/290 |
| 4,224,487 A * | 9/1980 | Simonsen | 200/61.08 |
| 4,315,235 A * | 2/1982 | Jacobs, Jr. | 337/296 |
| 4,488,137 A * | 12/1984 | Rooney et al. | 337/162 |
| 4,581,504 A | 4/1986 | Hamel, Sr. | |
| 5,293,147 A * | 3/1994 | Oh et al. | 337/227 |
| 5,770,994 A * | 6/1998 | Evans | 337/295 |
| 5,793,275 A * | 8/1998 | Iversen | 337/273 |
| 6,222,438 B1 * | 4/2001 | Horibe et al. | 337/290 |
| 7,137,846 B1 | 11/2006 | Lim et al. | |
| 2004/0041682 A1 * | 3/2004 | Pasha et al. | 337/401 |
| 2004/0221638 A1 * | 11/2004 | Brede et al. | 72/326 |
| 2005/0003709 A1 | 1/2005 | Nagamine et al. | |
| 2005/0011687 A1 | 1/2005 | Yamaguchi et al. | |
| 2005/0171263 A1 | 8/2005 | Kanamori et al. | |
| 2006/0049027 A1 * | 3/2006 | Iversen | 200/61.8 |
| 2006/0145808 A1 * | 7/2006 | Von Behr et al. | 337/401 |
| 2006/0214259 A1 * | 9/2006 | Spaunhorst | 257/529 |
| 2006/0246769 A1 | 11/2006 | Lim et al. | |
| 2010/0122835 A1 | 5/2010 | Doi et al. | |
| 2010/0218970 A1 | 9/2010 | Eshima | |
| 2010/0328014 A1 * | 12/2010 | Suzuki et al. | 337/30 |

FOREIGN PATENT DOCUMENTS

| | | |
|---|---|---|
| DE | 19819662 A1 | 11/1998 |
| DE | 10017455 A1 | 10/2001 |
| EP | 0724983 A1 | 8/1996 |
| EP | 1440834 A1 | 7/2004 |
| JP | 2004224156 A | 8/2004 |
| JP | 20055042 A | 1/2005 |
| JP | 2006310263 A | 11/2006 |
| JP | 200937851 A | 2/2009 |
| JP | 2010225571 A | 10/2010 |

OTHER PUBLICATIONS

Written Opinion dated Dec. 9, 2011 from the International Searching Authority in counterpart application No. PCT/JP2011/071781.

Communication issued on Feb. 16, 2015 by The State Intellectual Property Office of PR of China in related application No. 201180044839.X.

Japanese Office Action corresponding the Japanese Application No. 2011-190359 mailed Sep. 25, 2015.

* cited by examiner

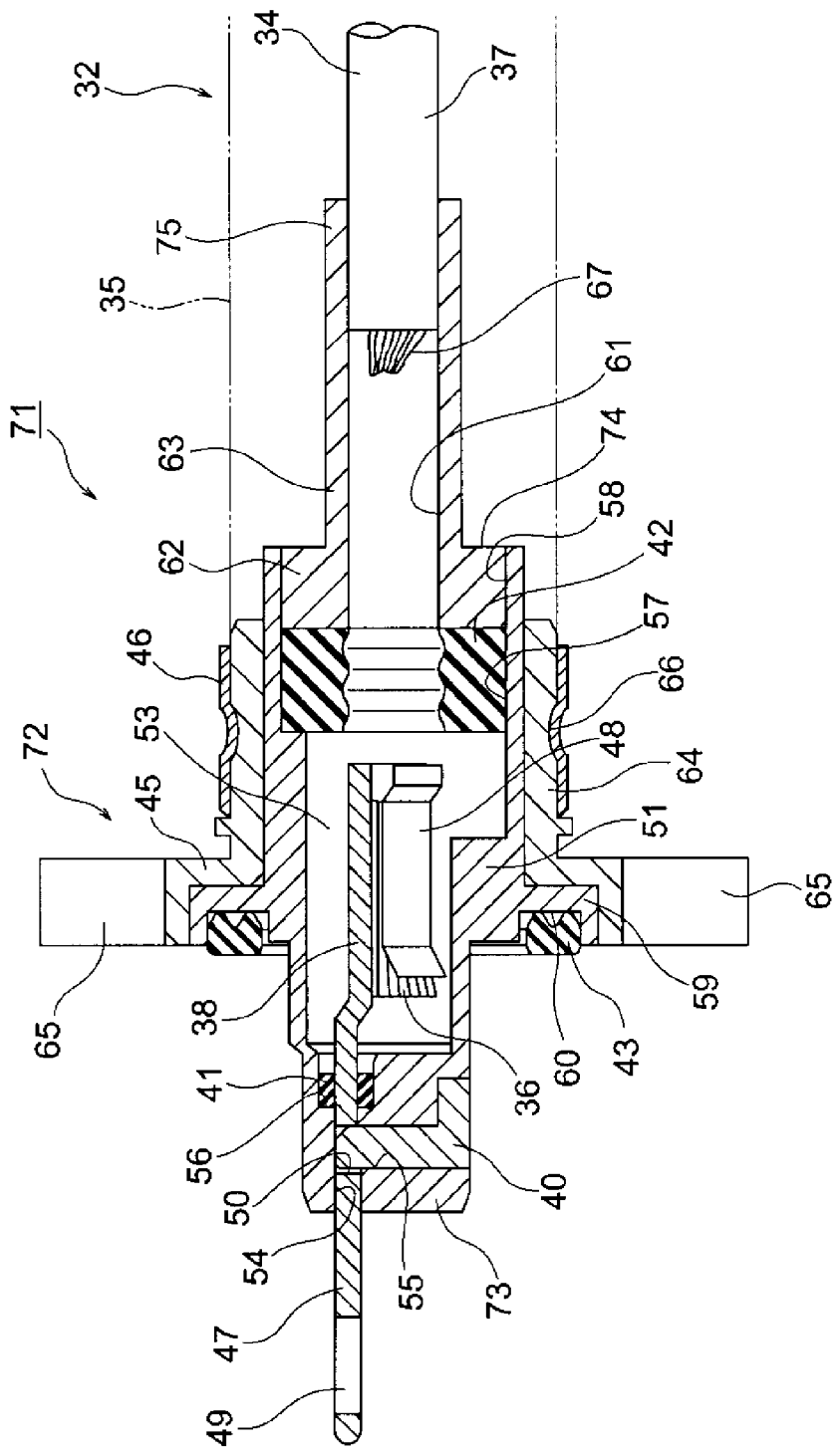

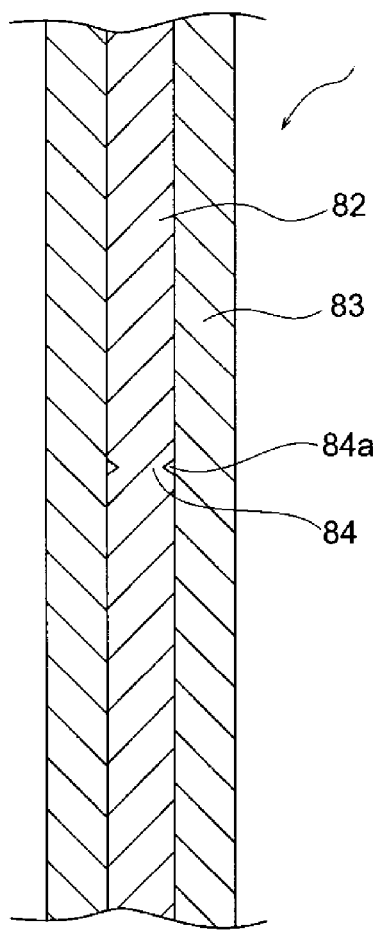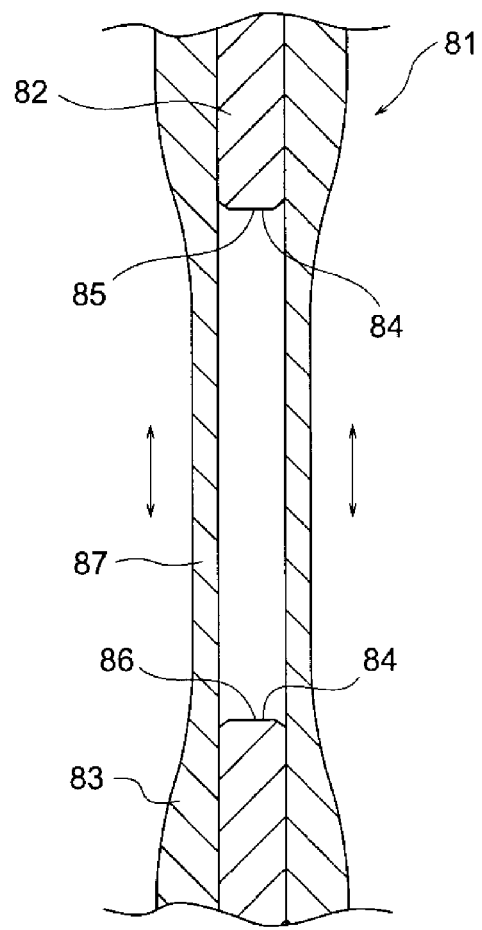

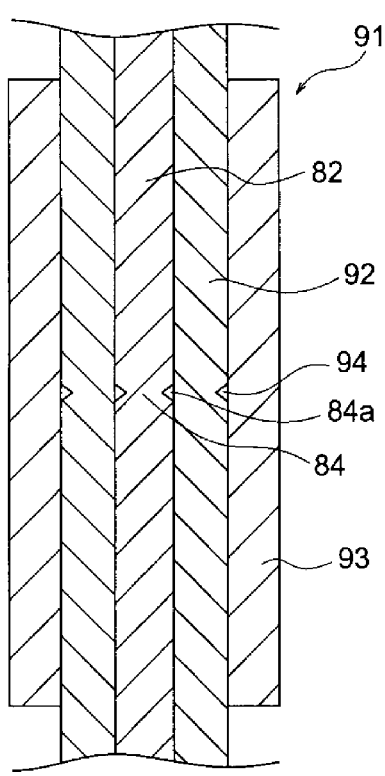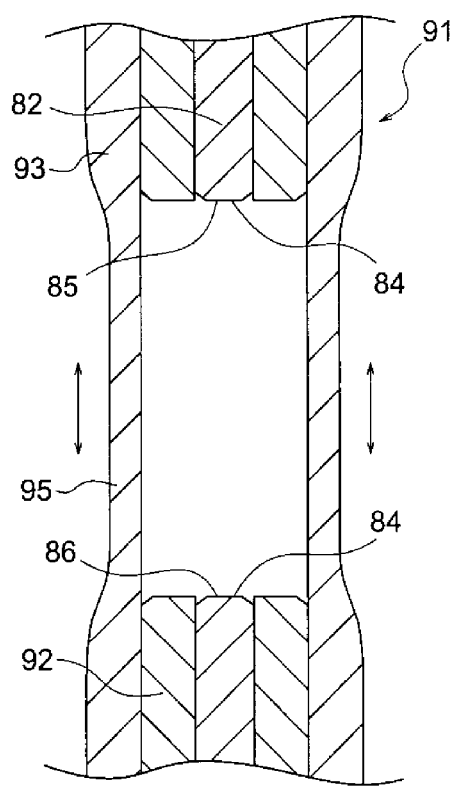

CONDUCTIVE PATH STRUCTURE AND WIRE HARNESS

TECHNICAL FIELD

The present invention relates to a structure of a conductive path that includes a conductor and a covering member covering the conductor. Furthermore, the present invention relates to a wire harness that includes a plurality of conductive paths.

BACKGROUND ART

Recently, hybrid motor vehicles and electric motor vehicles as eco cars have been attracting interest. Furthermore, a distribution rate thereof has increased. Hybrid motor vehicles and electric motor vehicles are equipped with a motor as a power source. In order to drive the motor, there is a need to electrically connect a portion between the battery and the inverter, and a portion between the inverter and the motor by a high voltage wire harness. The high voltage wire harness includes a plurality of high voltage wires that is conductive paths.

A plurality of high voltage wire harnesses is suggested. As an example thereof, there is a wire harness disclosed in Patent Literature 1 described below.

CITATION LIST

Patent Literature

[PTL 1] JP-A-2004-224156

SUMMARY OF INVENTION

Technical Problem

When an impact is applied to the hybrid motor vehicle or the electric motor vehicle from the outside, that is, when a collision or the like occurs, the high voltage wire constituting the wire harness may be cut off. When considering a case where the high voltage wire is cut off, whereby the peeled-out conductor comes into contact with a member having conductivity, device, vehicle body frame or the like, it is evident that great electric current flows into the above conductive member, device vehicle body frame or the like, which is very dangerous.

Solution to Problem

The present invention was made in view of the above circumstances, and an object thereof is to provide a conductive path structure and a wire harness capable of ensuring stability even when the conductive path is cut off.

In order to achieve the above object, according to the present invention, there is provided a conductive path structure comprising:

a conductor that includes a first conductive portion and a second conductive portion which are connected to each other through a cut-off facilitating portion; and an insulation member that covers the cut-off facilitating portion directly or indirectly, wherein when the cut-off facilitating portion is cut off so as to separate the first conductive portion and the second conductive portion to each other due to an impact applied to the cut-off facilitating portion, the insulation member is configured so as to cover the separated first conductive portion and the separated second conductive portion.

According to the above configuration, when the conductor is cut off, the insulation member exists at the outside of the first conductive portion and the second conductive portion separated by the cut-off. As a result, contact of the separated conductive portions to other member due to the cut off is restricted. Thus, according to the present invention, the first and second conductive portions are not exposed. In addition, according to the present invention, by providing a cut-off facilitating portion in the conductor, it is possible to control a cuttable location of the conductor.

Preferably, the cut-off facilitating portion is arranged at an intermediate portion of the conductor, at a connection portion where the cut-off facilitating portion is connected to a connecting member, or at a vicinity of the connecting portion.

According to the above configuration, even when the cut-off occurs in the intermediate portion of the conductor or the connection portion, the first and second conductive portion are not exposed.

Preferably, the insulation member is formed so as to be extensible.

According to the above configuration, when the conductor is cut off, since the insulation member is extended at this time, the first and second conductive portions are not exposed.

Preferably, the insulation member includes an insulation main body and an insulation extension portion, and the insulation extension portion is formed so as to be integrated with or separated from the insulation main body.

According to the above configuration, when the conductor is cut off, at the outside of one of the first and second conductive portions separated by the cut-off, the insulation extension portion constituting the insulation member exists, whereby the contact is restricted. Thus, according to the present invention, the one of the first and second conductive portions is not exposed.

Preferably, the insulation member includes a first insulation portion which covers the conductor and a second insulation portion which covers the conductor through the first insulation portion, and the first insulation portion has a cut-off facilitating portion which is located so as to match with the cut-off facilitating portion of the conductor.

Preferably, the cut-off facilitating portion is a conductive portion of the conductor on which a groove is formed.

Preferably, the cut-off facilitating portion is a conductive portion of the conductor on which a notch is formed.

Preferably, the cut-off facilitating portion is a conductive portion of the conductor in which a through hole is formed.

Preferably, the cut-off facilitating portion is a conductive portion of the conductor having a thin portion thinner than the first and second conductive portions.

Preferably, the insulation extension portion is formed in a cylindrical shape made of elastomer and is formed so as to be separated from the insulation main body.

According to the above configuration, when the conduction path is cut off, the insulation extension portion made of elastomer having the cylindrical shape exists outside the cut-off facilitating portion to be entering the separated state by the cut-off, whereby the contact is restricted. Since the insulation extension portion is made of elastomer, when the route of the conduction path is changed in that situation, the insulation extension portion follows the deformation.

According to the present invention, there is also provided a wire harness including a plurality of conductive paths each having the conductive path structure.

According to the above configuration, since the wire harness includes the plurality of conductive paths having a structure in which the first and second conductive portions are not exposed, even when the conductor is cut off, the stability is ensured.

Advantageous Effects of Invention

According to the present invention described above, an effect is exhibited in which the exposure of the first and second conductive portions of the conductor can be prevented even when the conductor is cut off. Thus, an effect is exhibited in which the stability can be ensured.

According to the present invention described above, an effect is exhibited in which it is possible to prevent the exposure of the first and second conductive portions in the middle portion or the connection portion of the conductive path.

According to the present invention described above, an effect is exhibited in which it is possible to contribute to the exposure prevention of the first and second conductive portions by forming the insulation member so as to be extensible.

According to the present invention described above, an effect is exhibited in which it is possible to contribute to the exposure prevention of the first and second conductive portions by the configuration in which the insulation member includes the insulation main body and the insulation extension portion.

According to the present invention described above, an effect is exhibited in which a wire harness having high stability can be provided.

BRIEF DESCRIPTION OF DRAWINGS

FIG. 1A is a schematic diagram that shows an arrangement example, and FIG. 1B is a schematic perspective view of a wired harness end portion.

FIG. 4 is a cross-sectional view that shows a cut-off state of the conductive path structure and the conductive path of an Example 2.

FIG. 5A is a cross-sectional view that shows the conductive path structure of the present invention, and FIG. 5B is a cross-sectional view that shows the cut-off state of the conductive path of an Example 3.

FIG. 7A is a cross-sectional view that shows the conductive path structure of the present invention, and FIG. 7B is a cross-sectional view that shows the cut-off state of the conductive path according to an Example 4.

DESCRIPTION OF EMBODIMENTS

A conductive path structure of the present invention is a structure that covers the outside of a cuttable portion of a conductor in a conductive path with an insulation member.

The wire harness of this Example is aimed at being placed in a hybrid motor vehicle or an electric motor vehicle. Hereinafter, the hybrid motor vehicle will be described as an example (even in the case of the electric motor vehicle, the configuration, the structure and the effect of the wire harness of the present invention are basically identical. Furthermore, the present invention can be applied to a normal motor vehicle or the like without being limited to a hybrid motor vehicle or an electric motor vehicle).

Figure 1A:
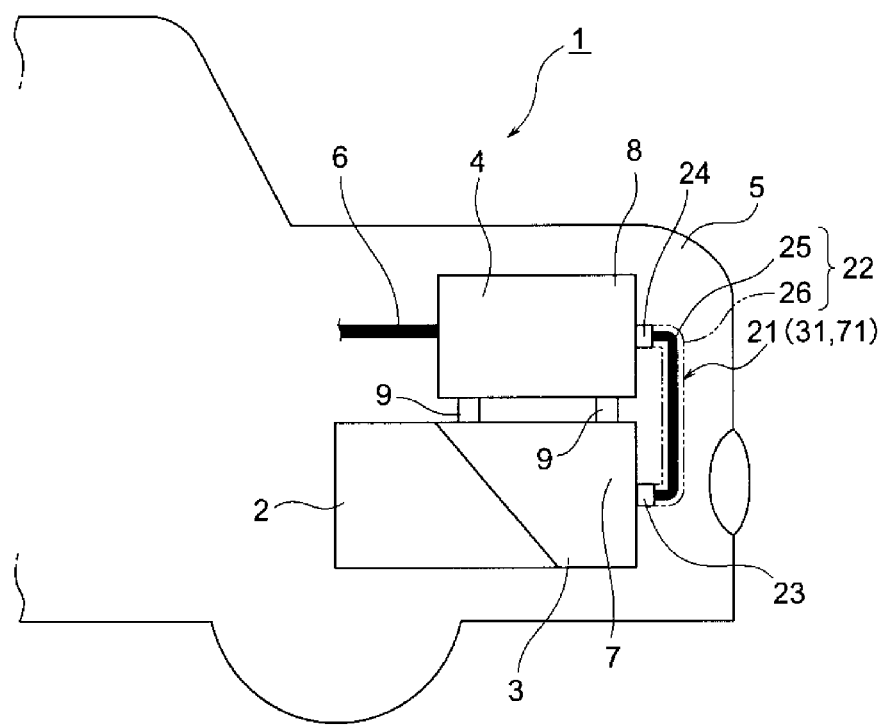
FIGS. 1A and 1B are diagrams that show a wire harness of the present invention.
Figure 1B:
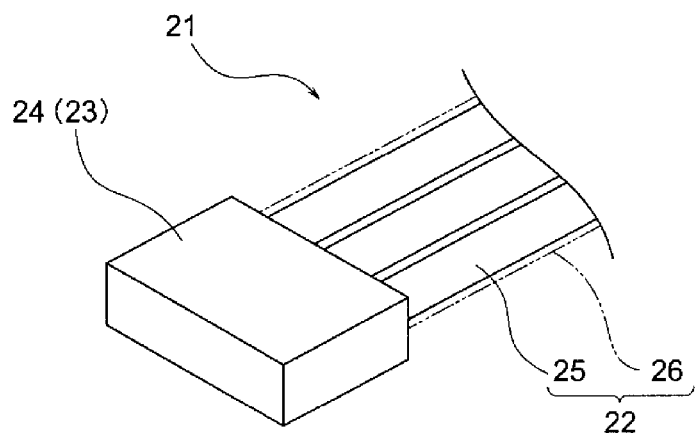

FIG. 1A is a schematic diagram that shows an arrangement of a wire harness of the Example 1, and FIG. 1B is a schematic perspective view of a wire harness end portion.

In FIG. 1A, reference numeral 1 indicates a hybrid motor vehicle. The hybrid motor vehicle 1 is a vehicle that mixes powers from an engine 2 and a motor unit 3 to drive. Electric power from a battery (a battery pack) (not shown) is supplied to the motor unit 3 via an inverter unit 4. The engine 2, the motor unit 3, and the inverter unit 4 are installed (mounted) in an engine room 5 of a position where a front wheel or the like is present in this Example. Furthermore, the battery (not shown) is installed (mounted) in a motor vehicle interior present in the rear part of the engine room 5 or a motor vehicle rear portion in which a rear wheel or the like is present.

The motor unit 3 and the inverter unit 4 are connected to each other by a wire harness 21 adapted to high voltage. Furthermore, the battery (not shown) and the inverter unit 4 are connected to each other by a high voltage wire harness 6. The wire harness 6 is arranged from the engine room 5 to the bottom floor, which is a ground side of a floor panel.

Herein, a supplementary description will be made on this Example. The motor unit 3 includes a motor and a generator. Furthermore, the inverter unit 4 includes an inverter and a converter. The motor unit 3 is formed as a motor assembly including a shield case 7. Furthermore, the inverter unit 4 is also formed as an inverter assembly including a shield case 8. The battery (not shown) is a Ni-MH-based battery or a Li-ion-based battery and is formed in a module shape. Furthermore, for example, it is also possible to use an electricity storage device such as a capacitor. The battery (not shown) is not particularly limited as long as it can be used in the hybrid motor vehicle 1 or the electric motor vehicle.

The inverter unit 4 is placed and fixed immediately over the motor unit 3 in this Example. That is, the inverter unit 4 and the motor unit 3 are placed so as to come into close contact with each other. Due to such an installation state, the wire harness 21 is shortened. Concerning the inverter unit 4 and the motor unit 3, reference numeral 9 indicates a fixing leg portion for being placed and fixed immediately over the motor unit 3.

A wire harness 21 includes a harness main body 22, a motor side connector 23 provided at one end of the harness main body 22, and an inverter side connecter 24 provided at the other end of the harness main body 22. The harness main body 22 includes a plurality (herein, three) of high voltage conductive paths 25 (conductive paths) aligned on approximately the same plane at predetermined intervals, and an electromagnetic shield member 26 that collectively covers the plurality of high voltage conductive paths 25.

The electromagnetic shield member 26 is a member for exhibiting an electromagnetic shield function, and is configured by, for example, a braid or a cylindrical metal foil. The electromagnetic shield member 26 is formed to have a length that covers the motor side connector 23 and the inverter side connector 24 in the present aspect.

The motor side connector 23 is fitted into a shield case 7 of the motor unit 3 and an inner portion thereof is electrically connected. Furthermore, the inverter side connector 24 is similarly fitted into the shield case 8 of the inverter unit 4, and an inner portion thereof is electrically connected.

The high voltage conductive path 25 has a structure that covers the outside of the cuttable portion provided in a conductor (not shown) with an insulation member. Although a specific structure will be described later, even when the high voltage conductive path 25 is cut off, the wire harness 21 can prevent the exposure of the conductor cut end portion. Furthermore, since the exposure of the conductor cut end portion can be prevented, the stability can also be ensured. Hereinafter, the present invention will be specifically described with reference to the Examples.

Example 1

Figure 2:
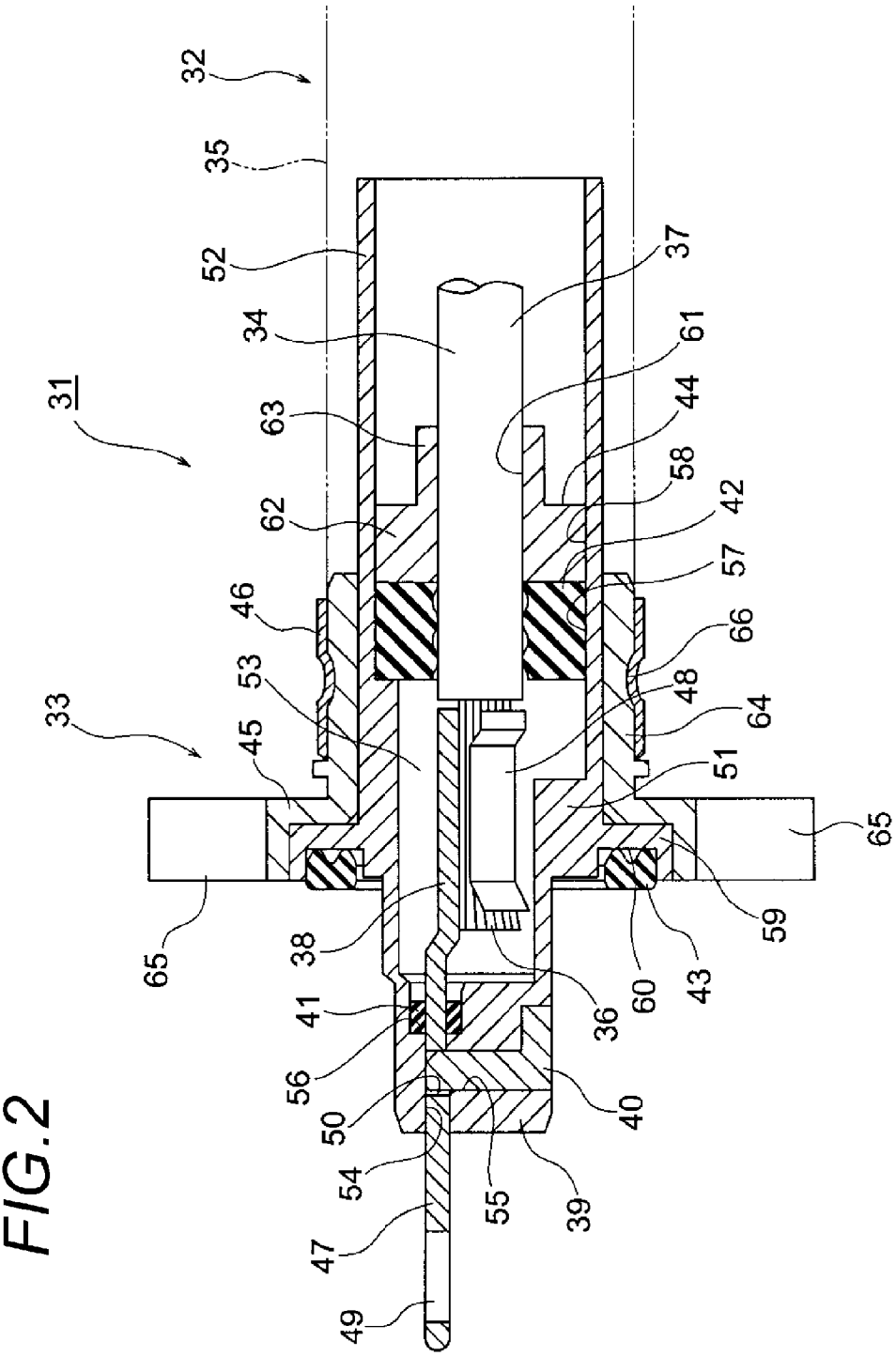
FIG. 2 is a cross-sectional view that shows a conductive path structure of an Example 1.
Figure 3:
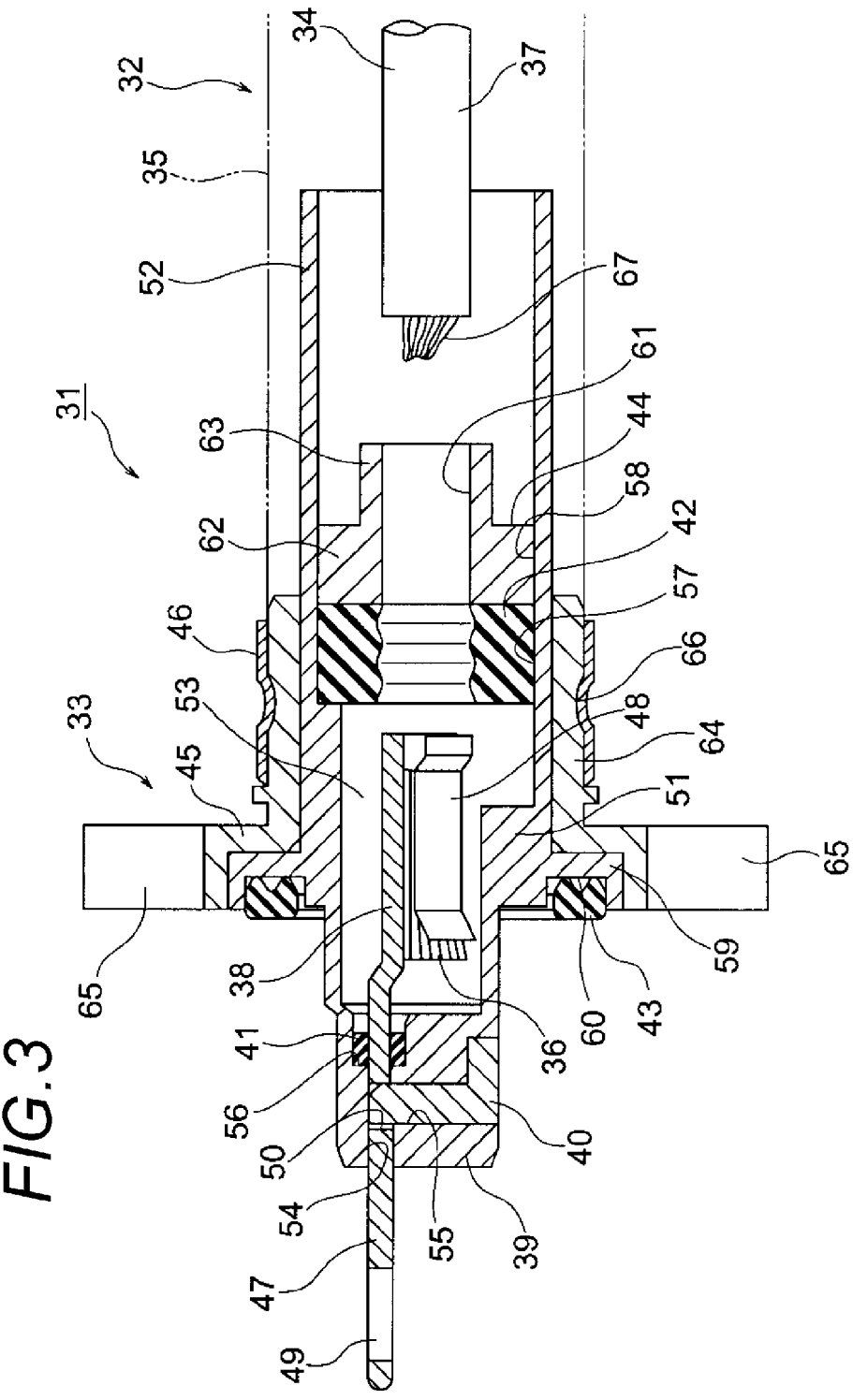
FIG. 3 is a cross-sectional view of a cut-off state of a conductive path.

Hereinafter, the Example 1 will be described with reference to the drawings. FIG. 2 is a cross-sectional view that shows a conductive path structure of the present invention. Furthermore, FIG. 3 is a cross-sectional view of the cut-off state of the conductive path.

In FIG. 2, the wire harness 31 includes a harness main body 32, a motor side connector (not shown) provided in one end of the wire main body 32, and an inverter side connector 33 provided in the other end of the harness main body 32. The harness main body 32 includes a plurality (herein, three) of high voltage wires 34 (conductive paths) aligned on approximately the same plane at predetermined intervals, and an electromagnetic shield member 35 that collectively covers the plurality of high voltage wires 34. The motor side connector (not shown) has basically the same configuration as the inverter side connector 33.

The high voltage wires 34 have a conductor 36 and an insulator 37 which covers the conductor 36. The high voltage wire 34 is processed so that the insulator 37 is peeled off at an end portion of the high voltage wire 34 by a predetermined length so as to expose the conductor 36. Herein, the conductor 36 has a conductor structure in which the strands (that are made of copper, copper alloy or aluminum) are twisted. Although not particularly limited, the conductor 36 is formed in a shape with a cross-section having an approximately round form (circular form). Furthermore, the conductor 36 may have a conductor structure of a rod shape having an approximately rectangular or round section (for example, a conductor structure having a straight angle single core or a round single core). Furthermore, for example, the conductor 36 may have a conductor structure of a braid bus bar.

The insulator 37 is formed by pressing and coating resin material having insulating properties to the outside of the conductor 36 and a known insulator is used herein.

The high voltage wire 34 is used in a high voltage application, and thus is formed in a large wire.

The electromagnetic shield member 35 is a member having an electromagnetic shield function, and is formed, for example, by a cylindrical shape of the braid or the metal foil. One end of the electromagnetic shield member 35 is, for example, fixed to a shield shell 45 described later of the inverter side connector 33 by a clamp. Furthermore, the other end thereof is also similarly fixed to the motor side connector (not shown) (the fixing of the electromagnetic shield member 35 is an example).

The inverter side connector 33 is a portion which is fitted into the shield case 8 (see FIG. 1A) of the inverter unit 4 and has an inner portion electrically connected, and the inverter side connector 33 includes a terminal metal fitting 38, a housing 39, a terminal engaging member 40, water-proof seal members 41 to 43, a rear holder 44, a shield shell 45, a fixing bolt (not shown), and a clamp ring 46.

The terminal fitting 38 is formed by pressing a metal plate having conductivity. As the terminal fitting 38, a male terminal fitting is used herein. The terminal fitting 38 has an electrical contact portion 47, and a wire connection portion 48 connected to the wire contact portion 47.

The electrical contact portion 47 is formed in a tab shape. In the electrical contact portion 47, a first through hole 49 and a second through hole 50 are formed. The first through hole 49 is formed as a portion that is electrically connected in the inner portion of the inverter unit 4 (see FIG. 1A). Meanwhile, the first through hole 50 is formed as a portion that is engaged by a terminal engaging member 40.

The wire connection portion 48 is formed so that the conductor 36 of the high voltage wire 34 can be connected and fixed thereto. In this Example, the conductor 36 is formed in a barrel shape so that the conductor 36 can be compressed by the clamp (the connection may use a welding or the like).

The housing 39 is a resin molding having insulating properties and corresponds to the insulation member. The housing 39 has a housing main body 51 (an insulation member main body) and a main body extension member 52 which is integrated with the housing main body 51 a shown in FIG. 2 (the shape is an example).

In the inner portion of the housing main body 51, a terminal accommodation chamber 53 is formed. The terminal accommodation chamber 53 is formed so that it can mainly accommodate the wire connection portion 48 of the terminal fitting 38 connected and fixed to the conductor 36 of the high voltage wire 34. In the terminal accommodation chamber 53, an electrical connection portion drawing hole 54 penetrating toward the tip of the housing is formed. When the terminal fitting 38 is accommodated in the terminal accommodation chamber 53, the electrical connection portion 47 is protruded from the tip of the housing via the electrical contact portion drawing hole 54.

In the housing main body 51, a terminal engaging member accommodation hole 55 penetrated through the electrical contact portion drawing hole 54 is formed from the lower part toward the upper part. The terminal fitting 38 is configured so that the second through hole 50 is engaged by the terminal engaging member 40 fitted into the terminal engaging member accommodation hole 55 whereby stopping is performed.

In the connection portion between the terminal accommodation chamber 53 and the electrical contact portion drawing hole 54, a shield member accommodation hole 56 is formed, the shield member 41 accommodated into the shield member accommodation hole 56 comes into the electrical contact portion 47 in a water tight manner.

In the terminal accommodation chamber 53, a shield member accommodation hole 57 is formed so as to be connected to the rear part. Furthermore, a rear holder accommodation hole 58 is continuously formed in the rear part. The shield member 42 accommodated in the shield member accommodation hole 57 comes into contact with the insulator 37 of the high voltage wire 34 in a water tight manner. The rear holder accommodation hole 58 is formed so that the rear holder 44 can be fitted thereinto. In the rear holder accommodation hole 58, the main body extension portion 52 is continuously formed.

The main body extension body 52 is formed so that it can cover the outside of a conductor cut end portion 67 described later. The main body extension portion 52 is formed so as to be lengthily extended rearward from the rear holder accommodation hole 58. The main body extension portion 52 is separated from the high voltage wire 34 as shown, and thus, is a portion that indirectly covers the outside of the conductor cut end portion 67 described later.

Furthermore, the main body extension portion 52 is continuously formed in the rear holder accommodation hole 58 in this Example, but the main body extension portion 52 is not limited thereto. That is, a cylindrical portion may be attached to the rear holder accommodation hole 58 from the back and the same is substituted for the main body extension portion. As an example, the cylindrical portion includes a pipe or a tube having insulating properties or a material in which an insulation tape is wound in a cylindrical shape or the like. If the cylindrical main body extension portion can cover the conductor cut end portion 67 described later, it can be a rigid body or have extensibility. The cylindrical main body extension portion formed of insulation tape may be formed in a so-called tape-winding shape so that an end thereof is fixed to the rear holder accommodation hole 58 and the other end thereof is also fixed to the insulator 37 of the high voltage wire 34. The main body extension portion such as rigid body, which is not extended, is configured so that the entire length thereof is set in consideration of the movement amount of the conductor cut end portion 67 described later.

In the outer portion of the housing main body 51, the flange portion 59 is formed. In the flange portion 59, a shield member accommodation groove 60 is formed. The shield member 43 accommodated in the shield member accommodation groove 60 comes into contact with the shield case 8 (see FIG. 1A) of the inverter unit 4 in a water tight manner.

The rear holder 44 is a resin molding having insulating properties and, although it is not particularly shown, it is formed in a shape divisible into two parts. The rear holder 44 has a wire insertion hole 61 penetrated so as to match with the diameter of the high voltage wire 34, a fitting portion 62 of a large diameter fitted into the rear holder accommodation hole 58, and a wire drawer portion 63 of a small diameter that is connected to the fitting portion 62 and draws the high voltage wire 34. The wire drawer portion 63 is formed so that the end portion is situated in the inner portion of the main body extension portion 52.

The shield shell 45 is a metal part having insulating properties, and has an approximately cylindrical shell main body 64, and a plurality of shell fixing portions 65. The shell main body 64 is formed in the shape in which the housing main body 51 can be accommodated into the inner portion. The shell fixing portion 65 is formed so as to be fixed to the shield case 8 (see FIG. 1A) of the inverter unit 4 using a fixing bolt (not shown).

In the shell main body 64, a clamp receptacle 66 is formed. Between the clamp receptacle 66 and the clamp ring 46, the one end of the electromagnetic shield member 35 is interposed. When the one end is interposed and fixed by the clamp, the electromagnetic shield member 35 is electrically connected to the shield case 8 (see FIG. 1A).

The operation of the wire harness, 31 when a hybrid motor vehicle 1 (see FIG. 1A) is crashed, will be described below based on the configuration and the structure mentioned above.

In FIG. 1A, when considering a case where the hybrid motor vehicle 1 has crashed, the inverter unit 4 is moved, for example, rearward with respect to the engine 2 and the motor unit 3. Since the wire harness 31 is connected to the motor unit 3 and the inverter unit 4, when the inverter unit 4 is moved rearward, an impact is applied to the wire harness 31 so as to draw the same.

When an impact is applied to the wire harness 31, the force is applied to the connection portion between the conductor 36 of the high voltage wire 34 and the wire connection portion 48 of the terminal fitting 38, and the conductor 36 in the connection portion is cut off as shown in FIG. 3. Specifically, a part of the conductor 36 remains in the clamp portion in the electrical connection portion 48, and the high voltage wire 34 side is cut off in the state in which the conductor cut end portion 67 is exposed. At this time, the conductor cut end portion 67 of the high voltage wire is exposed, but the outside of the conductor cut end portion 67 is covered with the main body extension portion 52, and thus, the electrical contact is restricted (when the movement amount is small, the outside of the conductor cut end portion 67 is covered with the housing main body 51, whereby the electrical contact is restricted).

As mentioned above, as described with reference to FIGS. 1 to 3, according to the present invention, even when the high voltage wire 34, which is the conductive path, is cut off, an effect is exhibited in which the exposure of the conductor cut end portion 67 can be prevented by the existence of the insulation member such as the main body extension portion 52. Thus, an effect is exhibited in which the stability can be ensured. In addition, according to the present invention, an effect is exhibited in which a wire harness 31 having high stability can be provided.

Example 2

Hereinafter, the Example 2 will be described with reference to the drawings. FIG. 4 is a cross-sectional view that shows a conductive path structure and a cut-off state of the conductive path of the present invention. Furthermore, the same components as those of the Example 1 mentioned above will be denoted by the same reference numerals and detailed descriptions thereof will be omitted.

In FIG. 4, a wire harness 71 includes a harness main body 32, a motor side connector (not shown) provided in one end of the wire main body 32, and an inverter side connector 72 provided in the other end of the harness main body 32.

The inverter side connector 72 is a portion which is fitted into the shield case 8 (see FIG. 1A) of the inverter unit 4 and has an inner portion electrically connected, and the inverter side connector 72 includes a terminal metal fitting 38, a housing 73, a terminal engaging member 40, water-proof seal members 41 to 43, a rear holder 44, a shield shell 45, a fixing bolt (not shown), and a clamp ring 46.

The Example 2 is different from the Example 1 in the structures of the housing 73 and the holder 74, but the effect obtained is identical.

The housing 73 is a resin molding having insulating properties and corresponds to the insulation member. The housing 73 is constituted by only the housing main body (the insulation member main body). That is, the housing 73 has the configuration and the structure in which the main body extension portion 52 (see FIGS. 2 and 3) in the Example 1 does not exist. In the Example 2, although it is apparent from the description as below, a part of the rear holder 74 separated from the housing main body 51 has the same function as the main body extension portion (see FIGS. 2 and 3).

The rear holder 74 is a resin molding having insulating properties and, although it is not specifically shown, it is formed in a shape divisible into two parts. The rear holder 74 has a wire insertion hole 61 penetrated so as to match with the diameter of the high voltage wire 34, a fitting portion 62 of a large diameter fitted into the rear holder accommodation hole 58, a wire drawer portion 63 of a small diameter that is connected to the fitting portion 62 and draws the high voltage wire 34, and a main body extension portion that is formed in a shape that extends the wire drawer portion 63 rearward. The wire drawer portion 63 and the main body extension portion 75 are formed so as to be situated rearward further than the rear end of the housing 73.

The main body extension body 75 is formed so that it can cover the outside of a conductor cut end portion 67 described later. The main body extension portion 75 is separated from the high voltage wire 34 as shown, and thus, is a portion that indirectly covers the outside of the conductor cut end portion 67 described later.

Furthermore, the main body extension portion 75 is continuously formed in wire drawer portion 63 in this Example, but the main body extension portion 75 is not limited thereto. That is, a cylindrical portion may be attached to the wire drawer portion 63 and the same may be substituted for the main body extension portion. As an example, the cylindrical portion includes a pipe or a tube having insulating properties or a material in which an insulation tape is wound in a cylindrical shape or the like. If the cylindrical main body extension portion can cover the conductor cut end portion 67, it may be a rigid body or have extensibility. The cylindrical main body extension portion formed of the insulation tape may be formed in a so-called tape-winding shape so that an end thereof is fixed to wire drawer portion 63 and the other end thereof is also fixed to the insulator 37 of the high voltage wire 34. The main body extension portion such as rigid body, which is not extended, is configured so that the entire length thereof is set in consideration of the movement amount of the conductor cut end portion 67 described later.

In the configuration and the structure mentioned above, when an impact such as collision is applied to the wire harness 71, the force is applied to the connection portion between the conductor 36 of the high voltage wire 34 and the wire connection portion 48 of the terminal fitting 38, and the conductor 36 in the connection portion is cut off as shown. Specifically, a part of the conductor 36 remains in the clamp portion in the electrical connection portion 48, and the high voltage wire 34 side is cut off in the state in which the conductor cut end portion 67 is exposed. At this time, the conductor cut end portion 67 is exposed to the high voltage wire 34, but the outside of the conductor cut end portion 67 is covered with the main body extension portion 75, and thus, the electrical contact is restricted (when the movement amount is small, the outside of the conductor cut end portion 67 is covered with the housing main body 51, or the fitting portion 62 in the rear holder 74 or the wire drawer portion 63, whereby the electrical contact is restricted).

As mentioned above, as described with reference to FIG. 4, according to the present invention, even when the high voltage wire 34, which is the conductive path, is cut off, an effect is exhibited in which the exposure of the conductor cut end portion 67 can be prevented by the existence of the insulation member such as the main body extension portion 75. Thus, an effect is exhibited in which the stability can be ensured. In addition, according to the present invention, an effect is exhibited in which a wire harness 71 having high stability can be provided.

Example 3

Figure 6A:
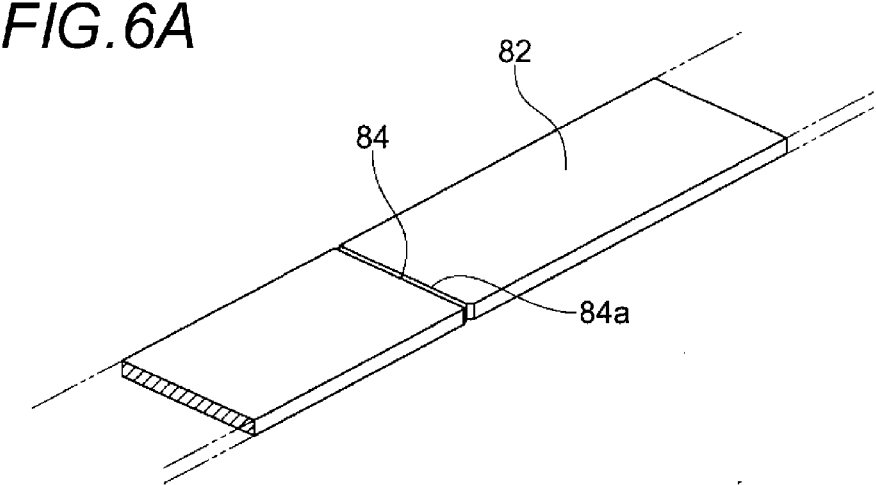
FIG. 6A is an enlarged perspective view of a cut-off facilitating portion in a cuttable portion in FIG. 5A, and FIGS. 6B and 6C are enlarged perspective views of modified examples.

Hereinafter, the Example 3 will be described with reference to the drawings. FIG. 5A is a cross-sectional view that shows a conductive path structure of the present invention, and FIG. 5B is a cross-sectional view that shows a cut-off state of the conductive path. Furthermore, FIG. 6A is an enlarged perspective view of the cut-off facilitating portion in a cuttable portion of FIGS. 5A and 5B, and FIGS. 6B and 6C are enlarged perspective views of modified examples.

In FIGS. 5A and 5B, the wire harness includes one or a plurality of conductive paths 81. In addition, although other configurations in the wire harness are omitted, they may be the same as those of the Examples 1 and 2. A conductive path 81 specifically described hereinafter can be applied to Examples 1 and 2.

The conductive path 81 includes a conductor 82, and an insulator 83 covering the conductor 82. The conductor 82 is formed by pressing a metal plate (that is formed of copper or a copper alloy or aluminum) having conductivity in this Example. That is, the conductor 82 is formed in a bus bar shape (a band plate shape) having a predetermined conductor width and thickness.

In addition, the conductor 82 is not limited to the bus bar shape. For example, the conductor 82 may be a conductor structure in which strands are twisted, or a conductor structure of a rod shape having a section of a rectangular form or a round form (for example, a conductor structure formed of a straight angle single core or a round single core). If the cut-off facilitating portion 84 described later can be provided, that is, if the cuttable portion is provided, the conductor 82 is not particularly limited. In the middle of the conductor 82, the cut-off facilitating portion 84 is provided (the arrangement is an example).

The cut-off facilitating portion 84 is provided as a cuttable portion in the conductor 82. Furthermore, for example, when an external force such as collision is applied, the cut-off facilitating portion 84 is provided as a portion to be cut just ahead in the conductor 82.

Figure 6B:
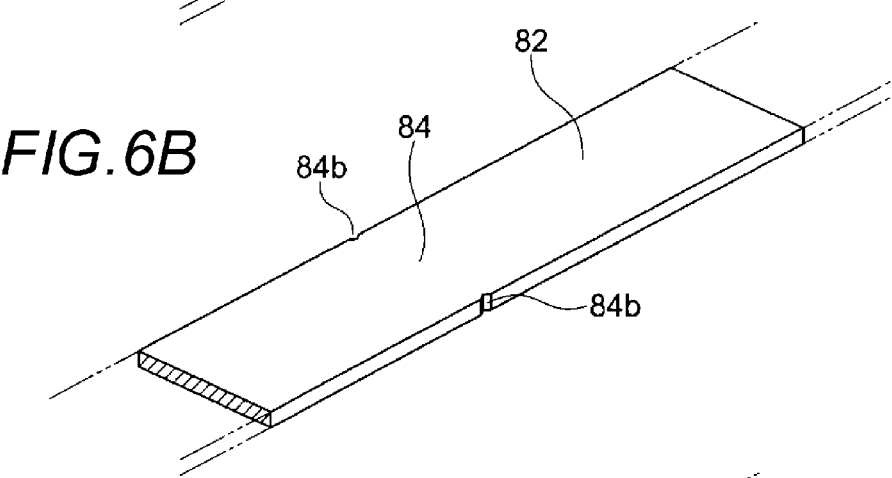
Figure 6C:
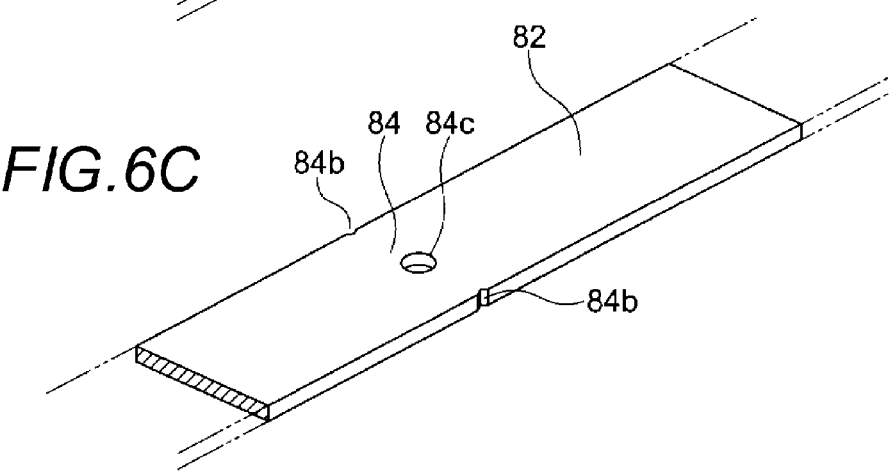

The cut-off facilitating portion 84 is configured that the grooves 84a are formed over the whole periphery of a bus bar as shown in FIG. 6A, that V shaped grooves or U shaped grooves are formed in a plane portion of the bus bar although it is not particularly shown, that notches 84b are formed in both side portions of the bus bar as shown in FIG. 6B, that notches 84b and holes 84c penetrating the plane portion of the bus bar as shown in FIG. 6C, or that the bus bar plane portion is pressed so as to be a thinly form, although it is not particularly shown.

The insulator 83 is a part, in which a resin material or elastomer having insulating properties or extensibility provided outside the conductor 82, and includes the molding or over-mold due to the extrusion, as an example. The insulator 83 corresponds to the insulation member, and is provided as a portion that directly covers the outside of the conductor 82.

In the configuration and the structure mentioned above, when an impact such as collision is applied to the wire harness, the force is applied to the cuttable portion in the conductor 82 of the conductive path 81, specifically, to the cut-off facilitating portion 84, and the conductor 82 is cut off as shown in FIG. 5B. At this time, the conductor 82 is divided into one conductor cut end portion 85 and the other conductor cut end portion 86. When the conductor 82 is cut off and divided at the position of the cut-off facilitating portion 84, the insulator 83 is extended without being divided or cut. That is, an extension portion 87 is generated.

In one conductor cut end portion 85, the insulator 85 (the extension portion 87) exists at the outside thereof, whereby the electrical contact of the one conductor cut end portion 85 to other member is restricted. Furthermore, since the insulator 83 (the extension portion 87) exists at the outside of the other conductor cut end portion 86, the electrical contact of the other conductor cut end portion 86 to other member is also hereby restricted.

As mentioned above, as described with reference to FIGS. 5 and 6, according to the present invention, even when the conductive path 81 is cut off, an effect is exhibited in which the exposure of the conductor cut end portions 85 and 86 can be prevented by the existence of the insulator 83 (the extension portion 87) which is the insulation member. Thus, an effect is exhibited in which the stability can be ensured. In addition, according to the present invention, an effect is exhibited in which a wire harness having high stability can be provided.

Example 4

Hereinafter, the Example 4 will be described with reference to the drawings. FIG. 7A is a cross-sectional view that shows a conductive path structure of the present invention, and FIG. 7B is a cross-sectional view that shows a cut-off state of the conductive path. Furthermore, the same components as those of the Example 3 will be denoted by the same reference numerals and the detailed descriptions thereof will be omitted.

In FIGS. 7A and 7B, the wire harness includes one or a plurality of conductive paths 91. In addition, although other configurations in the wire harness are omitted, they may be the same as those of the Examples 1 and 2. A conductive path 91 specifically described hereinafter can be applied to the Examples 1 and 2.

The conductive path 91 includes a conductor 82 having a cut-off facilitating portion 84 as a cuttable portion, an insulator 92 covering the conductor 82, and an insulation member 93 provided outside the insulator 92.

The insulator 92 is formed by extruding and coating the resin material 82 having insulating properties to the outside of the conductor 82 (the over-mold is also possible), and a known one is used herein. On the outer periphery of the insulator 92, although it is not particularly limited, the cut-off facilitating portion 94 is provided. The cut-off facilitating portion 94 is provided so as to match with the position of the cut-off facilitating portion 84 of the conductor 82. If the cut-off of the insulator 92 is easy, the form of the cut-off facilitating portion 94 is not particularly limited.

The insulation member 93 corresponds to an insulation member, and is provided as a portion that indirectly covers the outside of the cuttable portion in the conductor 82. The insulation member 93 is formed by the use of a resin material or elastomer having the insulating properties and extensibility and is provided outside the insulator 92. The insulation member 93 is provided by being molded or over-molded through extrusion or being formed in the cylinder shape and being fixed to the insulator 92, or by winding the insulation tape so as to be formed in the cylindrical shape.

In the configuration and the structure mentioned above, when an impact such as collision is applied to the wire harness, the force is applied to the cuttable portion in the conductor 82 of the conductive path 91 and the cuttable portion in the insulator 92, specifically, to the cut-off facilitating portions 84 and 94, and the conductor 82 and the insulator 92 are cut off as shown in FIG. 7B. At this time, the conductor 82 is divided into one conductor cut end portion 85 and the other conductor cut end portion 86. When the conductor 82 is cut off and divided in the position of the cut-off facilitating portion 84, the insulation member 93 is extended without being divided or cut. That is, an extension portion 95 is generated.

At the outside of one conductor cut end portion 85, the insulation member 93 (the extension portion 95) exists, whereby the electrical contact is restricted. Furthermore, since the insulation member 93 (the extension portion 95) also exists at the outside of the other conductor cut end portion 86, the electrical contact is restricted.

As mentioned above, as described with reference to FIGS. 7A and 7B, according to the present invention, even when the conductive path 91 is cut off, an effect is exhibited in which the exposure of the conductor cut end portions 85 and 86 can be prevented by the existence of the insulation member 93 (the extension portion 95). Thus, an effect is exhibited in which the stability can be ensured. In addition, according to the present invention, an effect is exhibited in which a wire harness having high stability can be provided.

Furthermore, although the insulation member 93 of this Example has extensibility, the present invention is not limited thereto. That is, if the entire length is set in consideration of the amount concerning the separation between one conductor cut end portion 85 and the other conductor cut end portion 86, the insulation member 93 may be a rigid body (the extension may not exist). The insulation member 93 may be formed of a tube or a pipe having rigidity.

Example 5

Figure 8:
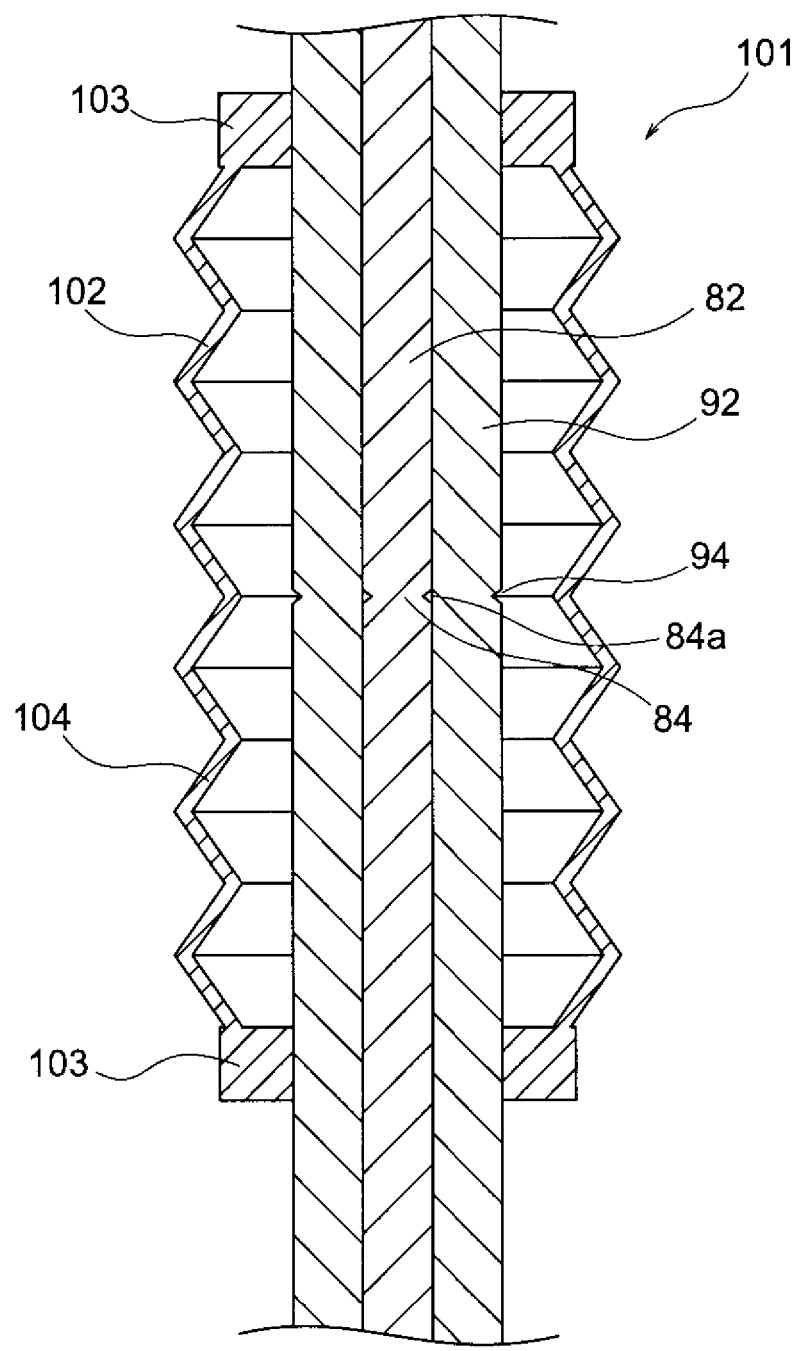
FIG. 8 is a cross-sectional view that shows the conductive path structure of an Example 5.

Hereinafter, the Example 5 will be described with reference to the drawings. FIG. 8 is a cross-sectional view that shows a conductive path structure of the present invention. Furthermore, the same components as those of the Examples 3 and 4 will be denoted by the same reference numerals and the detailed descriptions thereof will be omitted.

In FIG. 8, the wire harness includes one or a plurality of conductive paths 101. In addition, although other configurations in the wire harness are omitted, they may be the same as those of the Examples 1 and 2. The conductive path 101 specifically described hereinafter can be applied to the Examples 1 and 2.

The conductive path 101 includes a conductor 82 having a cut-off facilitating portion 84 as a cuttable portion, an insulator 92 covering the conductor 82, and an insulation member 102 provided outside the insulator 92.

The insulation member 102 corresponds to an insulation member, and is provided as a portion that indirectly covers the outside of the cuttable portion in the conductor 82. The insulation member 102 is formed by the use of a resin material or elastomer having the insulating properties and extensibility, and is provided outside the insulator 92. The insulation member 102 is formed in an approximately cylinder shape. The insulation member 102 has a pair of fixing portions 103 fixed to the insulator 92, and a bellows portion 104 provided between the pair of fixing portions 103, and is formed in the shape shown. The bellows portion 104 is a bellows shape or a bush shape, and has extensibility.

In the configuration and the structure mentioned above, when an impact such as collision is applied to the wire harness, the force is applied to the cuttable portion in the conductor 82 of the conductive path 101 and the cuttable portion in the insulator 92, specifically, to the cut-off facilitating portions 84 and 94, and the conductor 82 and the insulator 92 are cut off (not shown). At this time, the conductor 82 is divided into one conductor cut end portion and the other conductor cut end portion (see FIG. 7B). When the conductor 82 is cut off and divided in the position of the cut-off facilitating portion 84, the bellows portion 104 of the insulation member 102 is extended.

At the outside of one conductor cut end portion, the bellows portion 104 exists, whereby the electrical contact is restricted. Furthermore, since the bellows portion 104 also exists at the outside of the other conductor cut end portion, the electrical contact is restricted.

As mentioned above, as described with reference to FIG. 8, according to the present invention, even when the conductive path 101 is cut off, an effect is exhibited in which the exposure of the conductor cut end portions can be prevented by the existence of the bellows portion 104 in the insulation member 102. Thus, an effect is exhibited in which the stability can be ensured. In addition, according to the present invention, an effect is exhibited in which a wire harness having high stability can be provided.

Example 6

Figure 9:
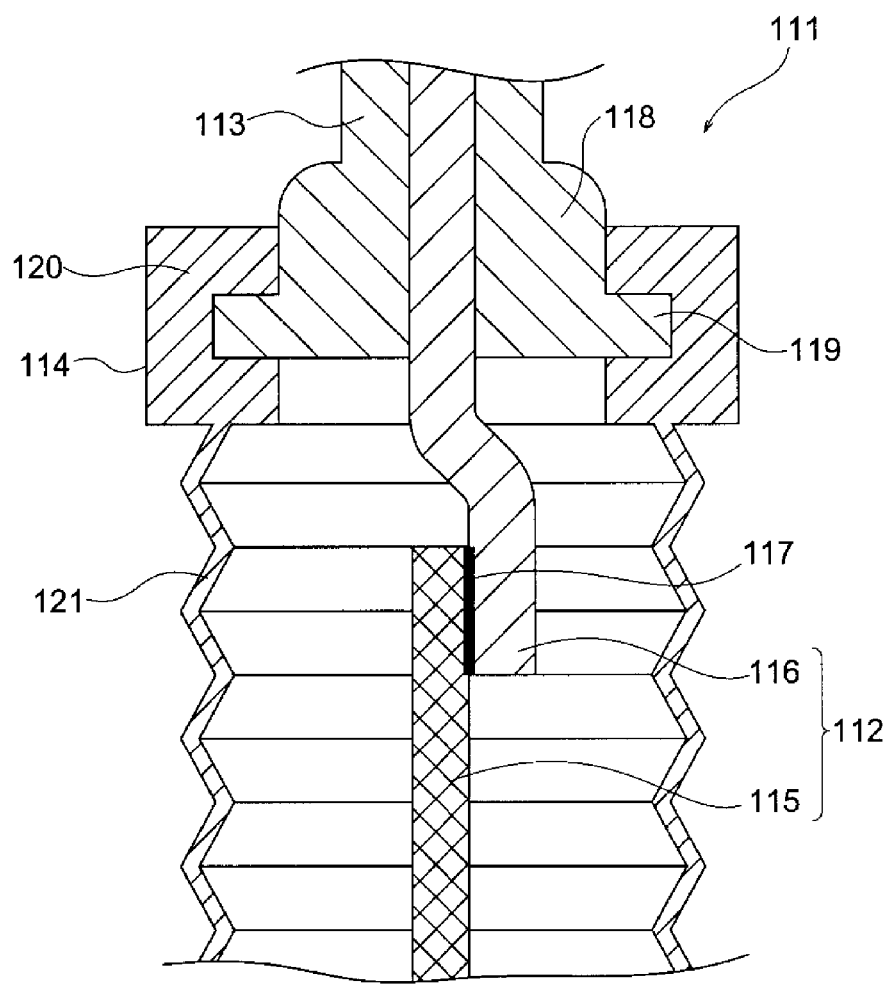
FIG. 9 is a cross-sectional view that shows the conductive path structure of an Example 6.

Hereinafter, the Example 6 will be described with reference to the drawings. FIG. 9 is a cross-sectional view that shows a conductive path structure of the present invention.

In FIG. 9, the wire harness includes one or a plurality of conductive paths 111. In addition, although other configurations in the wire harness are omitted, they may be the same as those of the Examples 1 and 2. The conductive path 111 specifically described hereinafter can be applied to the Examples 1 and 2.

The conductive path 111 includes a conductor 112, an insulator 113 covering the conductor 112, and an insulation member 114 provided outside the insulator 113.

The conductor 112 includes a cutting conductor 115 placed in the cuttable portion, and bus bar conductors 116 that are continuously formed in both ends of the cutting conductor 115, respectively. The cutting conductor 115 is formed of the known braid bus bar in this Example (it is an example, and if it can be cut, it is not particularly limited). In the bus bar conductor 116, the same one as the conductor 82 is used. The cutting conductor 115 and the bus bar conductor 116 are joined by a welding 117 in this Example (the joining is not particularly limited to the welding process).

The insulator 113 is formed by over-molding the resin material having insulating properties to the outside of the bus bar conductor 116, and the end portion 118 thereof is formed with an annular engaging convex portion 119. The annular convex portion 119 is engaged with an engagement concave portion 120 described later of the insulation member 114.

The insulation member 114 corresponds to an insulation member, and is provided as a portion that covers the outside of the cuttable portion (a portion in which the cutting conductor 115 is situated) in the conductor 112. The insulation member 114 is formed by the use of a resin material or elastomer having the insulating properties and extensibility, and is provided so as to connect a portion between the outside of insulator 113 and the end portion 118. The insulation member 114 is formed in an approximately cylinder shape. The insulation member 114 has a pair of engagement concave portions 120 engaged with the annular convex portions 119 of the insulator 113, and a bellows portion 121 provided between the pair of engagement concave portions 120, and is formed in the shape shown. The bellows portion 121 has a bellows shape or a boots shape and has extensibility.

In the configuration and the structure mentioned above, when an impact such as collision is applied to the wire harness, the force is applied to the cuttable portion in the conductor 112 of the conductive path 111, specifically, to the cutting conductor 115, and the cutting conductor 115 is cut off (not shown). At this time, the cutting conductor 115 is divided into one conductor cut end portion and the other conductor cut end portion. When the conductor 112 is cut off and divided in the position of the cutting conductor 115, the bellows portion 114 of the insulation member 121 is extended.

At the outside of one conductor cut end portion, the bellows portion 121 exists, whereby the electrical contact is restricted. Furthermore, since the bellows 121 also exists at the outside of the other conductor cut end portion, the electrical contact is restricted.

As mentioned above, as described with reference to FIG. 9, according to the present invention, even when the conductive path 111 is cut off, an effect is exhibited in which the exposure of the conductor cut end portion can be prevented by the existence of the bellows portion 121 in the insulation member 114. Thus, an effect is exhibited in which the stability can be ensured. In addition, according to the present invention, an effect is exhibited in which a wire harness having high stability can be provided.

Example 7

Figure 10:
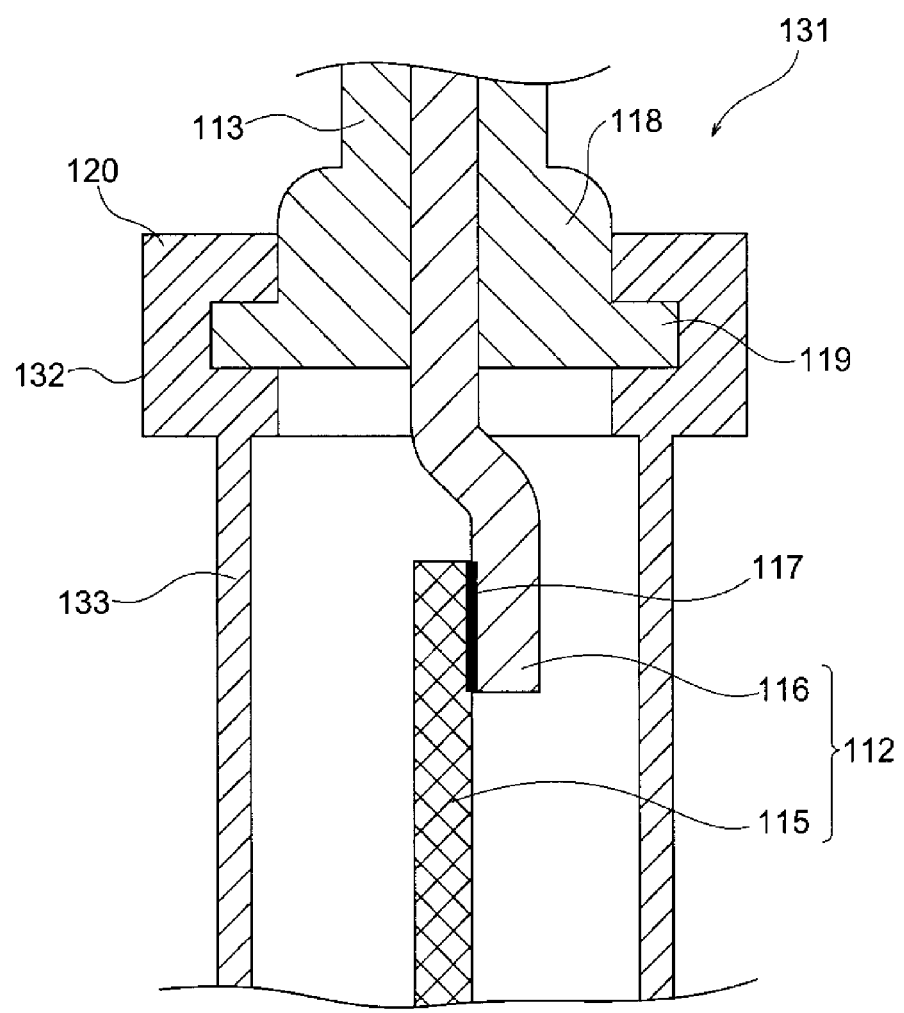
FIG. 10 is a cross-sectional view that shows the conductive path structure of an Example 7.

Hereinafter, the Example 7 will be described with reference to the drawings. FIG. 10 is a cross-sectional view that shows a conductive path structure of the present invention. Furthermore, the same components as the Example 6 are denoted by the same reference numerals and the detailed descriptions thereof will be omitted.

In FIG. 10, the wire harness includes one or a plurality of conductive paths 131. The conductive path 131 includes a conductor 112, an insulator 113 covering the conductor 112, and an insulation member 132 provided outside the insulator 113. The conductive path 131 is different from the Example 6 in the insulation member 132. Specifically, only a tube portion 133 described later is different.

The insulation member 132 corresponds to an insulation member, and is provided as a portion that covers the outside of the cuttable portion (a portion in which the cutting conductor 115 is situated) in the conductor 112. The insulation member 132 is formed by the use of a resin material or elastomer having the insulating properties and extensibility, and is provided so as to connect a portion between the outside of insulator 113 and the end portion 118. The insulation member 132 is formed in an approximately cylinder shape. The insulation member 132 has a pair of engagement concave portions 120 engaged with the annular convex portions 119 of the insulator 113, and an extensible tube portion 133 provided between the pair of engagement concave portions 120, and is formed in the shape shown.

The Example 7 has the same effect as the Example 6. Thus, even when the conductive path 131 is cut off, an effect is exhibited in which the exposure of the conductor cut end portion can be prevented by the existence of the tube portion 132 in the insulation member 132. Thus, an effect is exhibited in which the stability can be ensured. In addition, according to the present invention, an effect is exhibited in which a wire harness having high stability can be provided.

Example 8

Figure 11:
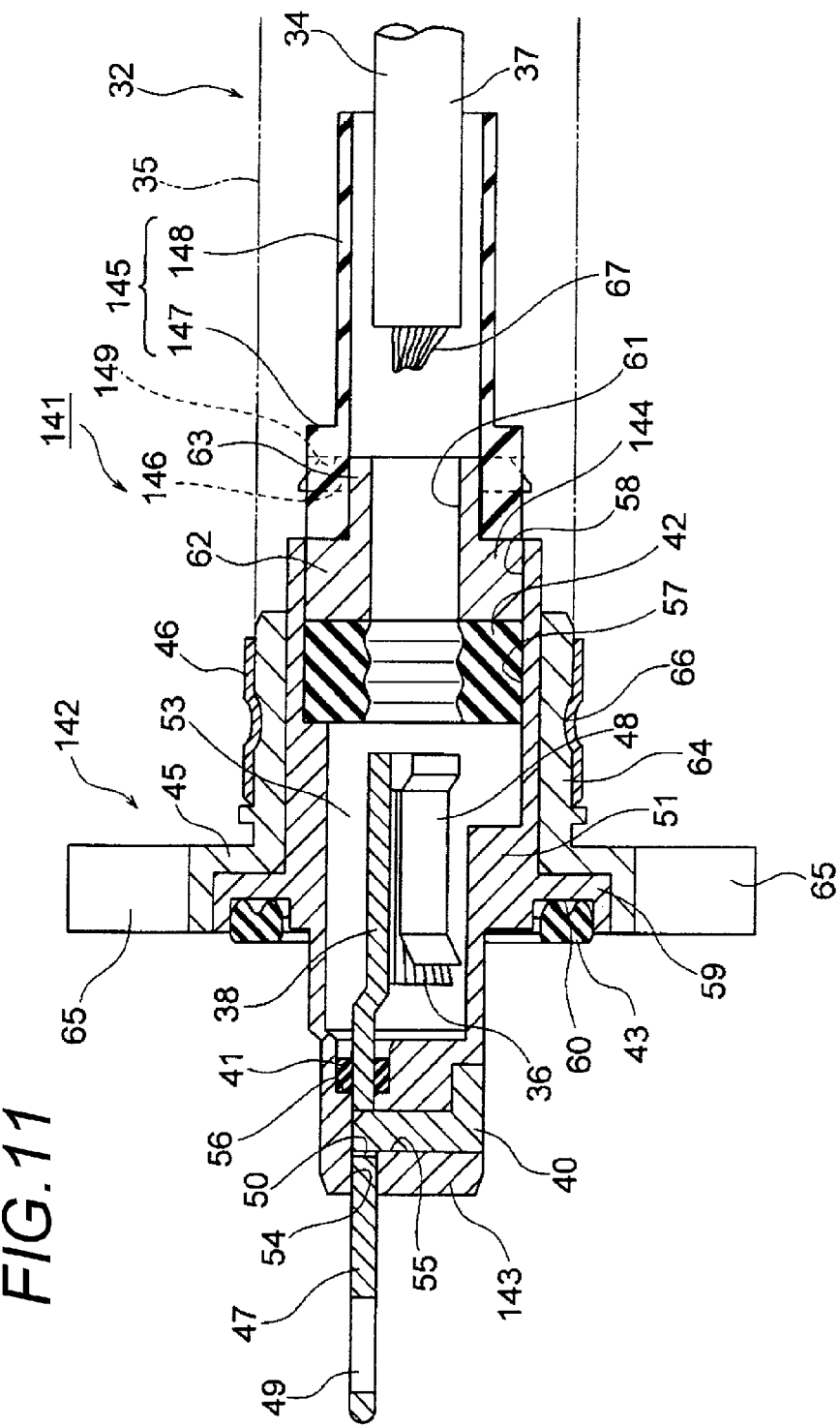
FIG. 11 is a cross-sectional view that shows the conduction path structure and the cut-off state of the conduction path of an Example 8.

Hereinafter, the Example 8 will be described with reference to the drawings. FIG. 11 is a cross-sectional view that shows the conduction path structure and the cut-off state of the conduction path of the present invention. Furthermore, the same components as the Example 1 are denoted by the same reference numerals and the detailed descriptions thereof will be omitted.

In FIG. 11, the wire harness 141 includes a harness main body 32, a motor side connector (not shown) provided in one end of the harness main body 32, and an inverter side connector 142 provided in the other end of the harness main body 32.

The inverter side connector 142 is inserted to the shield case 8 (see FIG. 1) of the inverter unit 4 and is electrically connected in the inner portion, and includes a terminal fitting 38, a housing 143, a terminal engagement member 40, waterproof shield members 41 to 43, a rear holder 144, an insulation cover 145, a shield shell 45, a fixing bolt (not shown), and a clamp ring 46.

The Example 8 is different from the Example 1 in the structures of the housing 143 and the rear holder 144 and is newly added with an insulation cover 145, but the obtained effect is equal to or greater than that.

The housing (insulation member) 143 is a resin molding having insulating properties. The housing 143 includes a housing main body 51 (the insulation main body) and a rear holder 144 (an insulation main body) to be attached to the housing main body 51. That is, the main body extension portion 52 (see FIGS. 2 and 3) in the Example 1 does not exist in the housing 143.

In the Example 8, although it is apparent from the description as below, the insulation cover 145 to be attached to the rear holder 144 has the same function as the main body extension portion 53 (see FIGS. 2 and 3). That is, the insulation cover 145 is adapted so as to function as the main body extension portion.

The rear holder 144 is a resin molding having insulating properties and, although it is not specifically shown, it is formed in a shape divisible into two parts. The rear holder 144 has a wire insertion hole 61 penetrated so as to match with the diameter of the high voltage wire 34, a fitting portion 62 with a large diameter fitted into the rear holder accommodation hole 58, a wire drawer portion 63 with a small diameter that is connected to the fitting portion 62 and draws the high voltage wire 34, and an engagement convex portion 146 that is formed in the end portion of the wire drawer portion 63 so as to be protruded in a direction perpendicular to an extension direction of the wire harness 141. The small diameter is smaller than the large diameter. The engaging convex portion 146 is formed so as to be able to hook the insulation cover 145 and restrict the falling out.

The insulation cover (insulation extension member) 145 is separated from the rear holder 144 that is a part of the insulator main body as above. The insulation cover 145 has the insulating property and extensibility, and is made of elastomer (for example, made of rubber). The insulation cover 145 is formed in a cylindrical shape, and has an engaging portion 147 with large diameter, and a cover portion 148 extended rearward from the engaging portion 147. The engaging portion 147 is formed with an engaging concave portion 149 that is hooked and engaged to the engaging convex portion 146 of the rear holder 144. The insulation cover 145 is formed so as to be engaged to the rear holder 144 even when rotating those members by 180° upside down.

Since the insulation cover (insulation extension portion) 145 is separated from the high voltage wire 34 as shown, the insulation cover 145 indirectly covers the outside of the conductor cut end portion 67.

Furthermore, the insulation cover 145 may have a shape that collectively covers an entirely of a plurality of high voltage wires 34, and may have a shape that individually covers the same.

In the configuration and the structure mentioned above, when an impact or the like is applied to the wire harness 141, the force is applied to the connection portion between the conductor 36 of the high voltage wire 34 and the wire connection portion 48 of the terminal fitting 38, and the conductor 36 in the connection portion is cut off as shown. Specifically, a part of the conductor 36 remains in the clamp portion in the electrical connection portion 48, and the high voltage wire 34 side is cut off in the state in which the conductor cut end portion 67 is exposed. At this time, the conductor cut end portion 67 of the high voltage wire 34 is exposed, but the outside of the conductor cut end portion 67 is covered with the insulation cover 145, and thus, the electrical contact to the electromagnetic shield member 35 is restricted (when the movement amount is small, the outside of the conductor cut end portion 67 is covered with the housing main body 51, the fitting portion 62 in the rear holder 144 or the wire drawer portion 63, whereby the electrical contact is restricted).

As mentioned above, as described with reference to FIG. 11, according to the present invention, even when the high voltage wire 34, which is the conduction path, is cut off, an effect is exhibited in which the exposure of the conductor cut end portion 67 can be prevented by the existence of the insulation member such as the insulation cover 145 corresponding to the main body extension portion. Thus, an effect is exhibited in which the stability can be ensured. In addition, according to the present invention, an effect is exhibited in which a wire harness 71 having high stability can be provided by the effect as above.

Furthermore, the wire harness 141 is electrically connected the motor unit 3 and the inverter unit 4 (see FIG. 1) and is arranged in the engine room 5. However, the arrangement of the wire harness 141 is not limited thereto. That is, although it is not particularly shown, when the rear motor unit or the inverter unit is mounted in the vehicle, the wire harness 141 may be arranged in a vehicle rear portion so as to connect the rear motor unit and the inverter unit to each other. The arrangement position is not limited to the Example 8 but can also be applied to other Examples.

Although the invention has been illustrated and described for the particular preferred Examples, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2010-207552 filed on Sep. 16, 2010 and Japanese Patent Application No. 2011-190359 filed on Sep. 1, 2011, the contents of which are incorporated herein by reference.

INDUSTRIAL APPLICABILITY

A conductive path structure and a wire harness capable of ensuring stability even when the conductive path is cut off can be provided.

REFERENCE SIGNS LIST

1 HYBRID MOTOR VEHICLE
2 ENGINE
3 MOTOR UNIT
4 INVERTER UNIT
5 ENGINE ROOM
6 WIRE HARNESS
7, 8 SHIELD CASE
9 FIXED LEG PORTION
21 WIRE HARNESS
22 HARNESS MAIN BODY
23 MOTOR SIDE CONNECTOR
24 INVERTER SIDE CONNECTOR
25 HIGH VOLTAGE CONDUCTIVE PATH (CONDUCTIVE PATH)
26 ELECTROMAGNETIC SHIELD MEMBER
31 WIRE HARNESS
32 HARNESS MAIN BODY

33 INVERTER SIDE CONNECTOR
34 HIGH VOLTAGE CONDUCTIVE PATH (CONDUCTIVE PATH)
35 ELECTROMAGNETIC SHIELD MEMBER
36 CONDUCTOR
37 INSULATOR
38 TERMINAL FITTING (CONNECTION MEMBER)
39 HOUSING (INSULATION MEMBER)
40 TERMINAL ENGAGEMENT MEMBER
41-43 SHIELD MEMBER
44 REAR HOLDER
45 SHIELD SHELL
46 CLAMP RING
47 ELECTRICAL CONTACT PORTION
48 WIRE CONNECTION PORTION
49 FIRST THROUGH HOLE
50 SECOND THROUGH HOLE
51 WIRE HARNESS MAIN BODY (INSULATION MEMBER MAIN BODY)
52 MAIN BODY EXTENSION PORTION
53 TERMINAL ACCOMMODATION PORTION
54 TERMINAL CONTACT PORTION DRAWING HOLE
55 TERMINAL ENGAGEMENT MEMBER ACCOMMODATION HOLE
56, 57 SEAL MEMBER ACCOMMODATION HOLE
58 REAR HOLDER ACCOMMODATION HOLE
59 FLANGE PORTION
60 SEAL MEMBER ACCOMMODATION PORTION
61 WIRE INSERTION HOLE
62 FITTING PORTION
63 WIRE DRAWER PORTION
64 SHELL MAIN BODY
65 SHELL FIXING PORTION
66 CLAMP RECEPTACLE
67 CONDUCTOR CUT END PORTION
71 WIRE HARNESS
72 INVERTER SIDE CONNECTOR
73 HOUSING (INSULATION MEMBER)
74 REAR HOLDER
75 MAIN BODY EXTENSION PORTION
81 CONDUCTIVE PATH
82 CONDUCTOR
83 INSULATOR (INSULATION MEMBER)
84 CUT-OFF FACILITATING PORTION
85 ONE CONDUCTOR CUT END PORTION
86 THE OTHER CONDUCTOR CUT END PORTION
87 EXTENSION PORTION
91 CONDUCTIVE PATH
92 INSULATOR
93 INSULATION MEMBER
94 CUT-OFF FACILITATING PORTION
95 EXTENSION PORTION
101 CONDUCTIVE PATH
102 INSULATION MEMBER
103 FIXING PORTION
104 BELLOWS PORTION
111 CONDUCTIVE PATH
112 CONDUCTOR
113 CONDUCTOR
114 INSULATION MEMBER
115 CUTTING CONDUCTOR
116 BUS BAR CONDUCTOR
117 WELDING
118 END PORTION
119 ANNULAR CONVEX PORTION
120 ENGAGEMENT CONCAVE PORTION
121 BELLOWS PORTION
131 CONDUCTIVE PATH
132 INSULATION MEMBER
133 TUBE PORTION
141 WIRE HARNESS
142 INVERTER SIDE CONNECTOR
143 HOUSING
144 REAR HOLDER
145 INSULATION COVER
146 ENGAGEMENT CONVEX PORTION
147 ENGAGING PORTION
148 COVER PORTION
149 ENGAGING CONCAVE PORTION

The invention claimed is:

1. A conductive path structure comprising:
a conductor that includes a first conductive portion and a second conductive portion which are connected to each other through a cut-off facilitating portion; and
an insulation member that covers the cut-off facilitating portion directly or indirectly,
wherein when the first conductive portion and the second conductive portion are separated from each other due to an impact applied to the cut-off facilitating portion, the insulation member covers the separated first conductive portion and the separated second conductive portion;
wherein the insulation member includes a first insulation portion which covers the conductor and a second insulation portion which covers the conductor through the first insulation portion; and
wherein the first insulation portion has a cut-off facilitating portion which is located so as to match with the cut-off facilitating portion of the conductor.

2. A conductive path structure comprising:
a conductor that includes a first conductive portion and a second conductive portion which are connected to each other through a cut-off facilitating portion; and
an insulation member that covers the cut-off facilitating portion directly or indirectly, the insulation member being extensible,
wherein when the first conductive portion and the second conductive portion are separated from each other due to an impact applied to the cut-off facilitating portion, the insulation member covers the separated first conductive portion and the separated second conductive portion.

3. The conductive path structure according to claim 2, wherein the cut-off facilitating portion is arranged at an intermediate portion of the conductor, at a connection portion where the cut-off facilitating portion is connected to a connecting member, or at a vicinity of the connecting portion.

4. The conductive path structure according to claim 2, wherein the insulation member includes an insulation main body and an insulation extension portion; and
wherein the insulation extension portion is formed so as to be integrated with or separated from the insulation main body.

5. The conductive path structure according to claim 2, wherein the cut-off facilitating portion is a conductive portion of the conductor on which a groove is formed.

6. The conductive path structure according to claim 2, wherein the cut-off facilitating portion is a conductive portion of the conductor on which a notch is formed.

7. The conductive path structure according to claim 2, wherein the cut-off facilitating portion is a conductive portion of the conductor in which a through hole is formed.

8. The conductive path structure according to claim 2, wherein the cut-off facilitating portion is a conductive portion of the conductor having a thin portion thinner than the first and second conductive portions.

9. The conductive path structure according to claim 4, wherein the insulation extension portion is formed in a cylindrical shape made of elastomer and is formed so as to be separated from the insulation main body.

10. A wire harness including a plurality of conductive paths each having the conductive path structure according to claim 2.

11. The conductive path structure according to claim 2, wherein the insulation member extends in response to the first conductive portion and the second conductive portion being separated from each other.

12. A conductive path structure comprising:
   a conductor that includes a first conductive portion and a second conductive portion which are connected to each other through a cut-off facilitating portion; and
   an insulation member that covers the cut-off facilitating portion directly or indirectly,
   wherein when the first conductive portion and the second conductive portion are separated from each other due to an impact applied to the cut-off facilitating portion, the insulation member covers the separated first conductive portion and the separated second conductive portion;
   wherein the insulation member is extensible; and
   wherein when the first conductive portion and the second conductive portion are separated from each other, the insulation member is extended to cover the first conductive portion and the second conductive portion which are separated from each other.

* * * * *